United States Patent
Tamura

(10) Patent No.: US 6,784,687 B2
(45) Date of Patent: Aug. 31, 2004

(54) DIAGNOSTIC DEVICE FOR ELECTRIC MECHANISM DRIVE CIRCUITS

(75) Inventor: Hideki Tamura, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/457,925

(22) Filed: Jun. 9, 2003

(65) Prior Publication Data

US 2003/0231029 A1 Dec. 18, 2003

(30) Foreign Application Priority Data

Jun. 10, 2002 (JP) ........................................ 2002-168725

(51) Int. Cl.[7] ............................................... G01R 31/34
(52) U.S. Cl. ..................... 324/772; 324/158.1; 318/434
(58) Field of Search .......................... 324/510–511, 545, 324/158.1, 771–772; 318/286, 434, 490, 798–805, 811–812; 388/903, 907.5

(56) References Cited

U.S. PATENT DOCUMENTS 4,924,158 A * 5/1990 Kelley et al. ............... 318/434
6,335,600 B1  1/2002 Kasai et al.
6,380,757 B1 * 4/2002 Draves et al. .............. 324/772

FOREIGN PATENT DOCUMENTS

JP   11-004501    1/1999
JP   11-263240    9/1999

* cited by examiner

Primary Examiner—Minh N. Tang
(74) Attorney, Agent, or Firm—Brinks Hofer Gilson & Lione

(57) ABSTRACT

A diagnostic device for drive circuits has first and second relays each with a movable contact for switching between a normally closed and open contact, a motor are connected to the contacts, first and second resistance voltage dividing circuits connected between the contacts and a reference potential point, a switching circuit connected between two the closed contacts and the reference potential point, and a diagnostic section. The diagnostic section diagnoses a state of supply of drive power to the motor based on voltage-division outputs of the first and second resistance voltage dividing circuits. A bias voltage is supplied to a connection point between the normally closed contacts and the switching circuit. An additional resistance voltage dividing circuit is connected between the connection point and the reference potential pointy. The connection between the motor and a circuit driving the motor based on a voltage-division output of the additional voltage dividing circuit.

3 Claims, 4 Drawing Sheets

DIAGNOSTIC DEVICE FOR ELECTRIC MECHANISM DRIVE CIRCUITS

BACKGROUND OF THE INVENTION

1. Field of the Invention

The present invention relates to a diagnostic device for electric mechanism drive circuits for diagnosing drive circuits of electric mechanisms including motors, and more particularly to a diagnostic device for electric mechanism drive circuits which diagnoses the state of an electric mechanism when the electric mechanism is to operate and the state of connection between the electric mechanism drive circuit and the electric mechanism, and thereby prevents the electric mechanism from running into trouble or being burnt.

2. Description of the Related Art

Known motor drive circuits according to the prior art for driving a motor for bidirectional revolutions include one having a pair of relays each provided with a normally closed contact, a normally open contact, a movable contact and a drive coil for switching over and driving the movable contact, and a control section supplying the drive coils of the relays with switching signals for switching over their movable contacts. In this motor drive circuit, both normally closed contacts are connected to a grounding point (reference potential point), both normally open contacts are connected to a power supply terminal and both terminals of the motor are connected between the two movable contacts. In response to a switching signal from the control section, if the movable contact of one relay is switched over towards the normally open contact, the motor is driven for revolution in one direction (forward direction), or if the movable contact of the other relay is switched over towards the normally open contact, the motor is driven for revolution in the other direction (reverse direction).

This kind of motor drive circuit, when it is to drive a motor, if there is any trouble in the motor itself, such as short circuiting between terminals, disconnection of a coil or the like, or any trouble in wiring for connecting the motor and a pair of relays, such as short circuiting between lines, disconnection or the like, will not only be unable to normally drive the motor but even invite a major accident, such as burning of the motor. In view of this risk, a diagnostic device for predicting any possible trouble in the motor or its connection wiring is used.

FIG. 4 here is a circuit diagram showing one example of configuration of such a known diagnostic device for motor drive circuits.

As shown in FIG. 4, this motor drive circuit diagnostic device is provided with a control unit 40 made up of a microcomputer having an operation controller 40(1) for controlling the overall operation and a diagnostic section 40(2) and the like; a motor 41 constituting a load; a first relay 42 having a movable contact 42(1), a normally closed contact 42(2), a normally open contact 42(3) and a drive coil 42(4); a second relay 43 having a movable contact 43(1), a normally closed contact 43(2), a normally open contact 43(3) and a drive coil 43(4); a first transistor drive circuit 44 which has a first transistor 44(1) and drives the first relay 42; a second transistor drive circuit 45 which has a second transistor 45(1) and drives the second relay 43; a first connection wiring section 46 having connection terminals 46(1) and 46(2) for connecting one end of the motor 41 and the first relay 42; and a second connection wiring section 47 having connection terminals 47(1) and 47(2) for connecting the other end of the motor 41 and the second relay 43. It is further provided with a switching circuit 48 having a field effect transistor 48(1); a first resistance voltage dividing circuit 49 made up of two series resistors 49(1) and 49(2); a second resistance voltage dividing circuit 50 made up of two series resistors 50(1) and 50(2), and a power supply terminal 51.

One end of the motor 41 is connected to the first connection wiring section 46, and the other end, to the second connection wiring section 47. In the first relay 42, the movable contact 42(1) is connected to the first connection wiring section 46, the normally closed contact 42(2), to the drain of the field effect transistor 48(1), the normally open contact 42(3), to the power supply terminal 51, one end of the drive coil 42(4), to the power supply terminal 51 and the other end, to the collector of the first transistor 44(1). In the second relay 43, the movable contact 43(1) is connected to the second connection wiring section 47, the normally closed contact 43(2), to the drain of the field effect transistor 48(1), the normally open contact 43(3), to the power supply terminal 51, one end of the drive coil 43(4), to the power supply terminal 51 and the other end, to the collector of the second transistor 45(1). In the first transistor drive circuit 44, the base of the first transistor 44(1) is connected to the operation controller 40(1) via a series resistor (no reference numeral assigned) and grounded via a base resistor (no reference numeral assigned) and a shunt capacitor (no reference numeral assigned), and the emitter of the same is directly grounded. In the second transistor drive circuit 45, the base of the second transistor 45(1) is connected to the operation controller 40(1) via a series resistor (no reference numeral assigned) and grounded via a base resistor (no reference numeral assigned) and a shunt capacitor (no reference numeral assigned), and the emitter of the same is directly grounded.

In the switching circuit 48, the gate of the field effect transistor 48(1) is connected to the operation controller 40(1) and grounded via a resistor (no reference numeral assigned), and the source of the same is directly grounded. In the first resistance voltage dividing circuit 49, one end of the resistor 49(1) is connected to the first connection wiring section 46, and the other end of the same is connected to the diagnostic section 40(2) and to one end of the resistor 49(2). One end of the resistor 49(2) is connected to the diagnostic section 40(2), and the other end of the same is grounded. In the second resistance voltage dividing circuit 50, one end of the resistor 50(1) is connected to the second connection wiring section 47 and the other end of the same is connected to the diagnostic section 40(2) and to one end of the resistor 50(2). One end of the resistor 50(2) is connected to the diagnostic section 40(2) and the other end of the same is grounded.

The motor drive circuit diagnostic device of the configuration described above operates as described below.

When the motor 41 is to be revolved in the forward direction, first an ON signal is supplied from the operation controller 40(1) to the field effect transistor 48(1) of the switching circuit 48 to turn on the field effect transistor 48(1); next an ON signal is supplied from the operation controller 40(1) to the first transistor 44(1) of the first transistor drive circuit 44 to turn on the first transistor 44(1); and a drive current is fed to the drive coil 42(4) of the first relay 42. Then the movable contact 42(1) is switched over from the normally closed contact 42(2) side to the normally open contact 42(3) side, and a current flows from the power supply terminal 51 to a grounding point via the first connection wiring section 46, the motor 41 and the second connection wiring section 47 thereby to revolve the motor 41 in the forward direction.

On the other hand, when the motor 41 is to be revolved in the reverse direction, first an ON signal is supplied from the operation controller 40(1) to the field effect transistor 48(1) of the switching circuit 48 to turn the field effect transistor 48(1); next an ON signal is supplied the operation controller 40(1) to the second transistor 45(1) of the second transistor drive circuit 45 to turn on the second transistor 45(1), and a drive current is fed to the drive coil 43(4) of the second relay 43. Then the movable contact 43(1) is switched over from the normally closed contact 43(2) to the normally open contact 43(3), and a current flows from the power supply terminal 51 to the grounding point via the second connection wiring section 47, the motor 41 and the first connection wiring section 46 thereby to revolve the motor 41 in the reverse direction.

When the motor 41 is driven to revolve in this way, the first resistance voltage dividing circuit 49 divides the voltage generated in the first connection wiring section 46 between the resistor 49(1) and the resistor 49(2), and supplies the divided voltages to the diagnostic section 40 (2). Similarly, the second resistance voltage dividing circuit 50 divides the voltage generated in the second connection wiring section 47 between the resistor 50(1) and the resistor 50(2), and supplies the divided voltages to the diagnostic section 40(2). The diagnostic section 40(2) monitors the divided voltages supplied from the first resistance voltage dividing circuit 49 and the second resistance voltage dividing circuit 50 and, if any of those divided voltages becomes abnormal, for instance if at a timing when the first connection wiring section 46 or the second connection wiring section 47 is to be supplied with a source voltage, which is the voltage from the power supply terminal 51 (when the motor 41 is to be driven for revolution), is not supplied with a divided voltage matching that source voltage, i.e. if the divided voltage is found failing to reach a first comparative voltage matching the preset source voltage, it will be diagnosed that there is either disconnection or ground fault in the first connection wiring section 46 or the second connection wiring section 47, or if no ground voltage is supplied to the first connection wiring section 46 or the second connection wiring section 47 at the timing it should be supplied (when the motor 41 is at halt) and instead any divided voltage is supplied, i.e. if the divided voltage is compared with a second comparative voltage matching a preset ground voltage and found surpassing the second comparative voltage, it will be diagnosed that there has arisen short circuiting (short circuiting between the motor 41 and the power supply terminal 51, i.e. between the first connection wiring section 46 and the second connection wiring section 47) in the first connection wiring section 46 or the second connection wiring section 47, and the abnormal state is notified by giving a pertinent indication on a display unit (not shown), lighting an alarm lamp and/or sounding an alarm buzzer.

Further, if an OFF signal is supplied from the operation controller 40(1) to the field effect transistor 48(1) of the switching circuit 48 in a short period of time immediately after the drive to revolve the motor 41 has ended to turn off the field effect transistor 48(1), even if short circuiting has arisen in the first connection wiring section 46 or the second connection wiring section 47, the source voltage of the first connection wiring section 46 or the second connection wiring section 47 in a short-circuited state will not flow to the grounding point via the field effect transistor 48(1), and accordingly no drive current will flow to the motor 41 or any other circuit element, so that the motor 41 can be prevented from burning or other circuit elements from being damaged otherwise.

In the known motor drive circuit diagnostic device described above, it is possible to diagnose the presence or absence of abnormality in any part, such as disconnection, ground fault or short circuiting when the motor 41 is being driven by connecting the switching circuit 48 to the normally closed contacts 42(2) and 43(2) of the first and second relays 42 and 43, the first resistance voltage dividing circuit 49 to the first connection wiring section 46 and the second resistance voltage dividing circuit 50 to the second connection wiring section 47, but this diagnosis in any case is accomplished after the motor 41 is set in a driven state. If the motor 41 is set in a driven state when there is disconnection, ground fault or short circuiting, even if it is driven for only a short period of time, a large current may flow momentarily to some part, and this could damage the motor drive circuit in some way or other.

SUMMARY OF THE INVENTION

An object of the present invention, attempted in view of the technical background described above, is to provide a diagnostic device for electric mechanism drive circuits enabled to perform diagnoses not only when the electric mechanism is being driven but also when the electric mechanism is not driven.

In order to achieve the object above, a diagnostic device for electric mechanism drive circuits according to the present invention comprises:

a drive circuit, provided with a pair of relays connected to an electric mechanism and a switching circuit connected between normally closed contacts of the pair of relays and a reference potential point, for driving the electric mechanism, an operation controller for regulating the drive circuit to control operation of the electric mechanism, voltage dividing circuits connected between the electric mechanism and the drive circuit, and a diagnostic section for diagnosing a state of supply of drive power to the electric mechanism on the basis of voltage-division outputs of the voltage dividing circuits, wherein a bias voltage supply circuit is provided to supply a bias voltage between connection points between the normally closed contacts of the pair of relays and the switching circuit, an additional voltage dividing circuit is connected between the connection point and the reference potential point, and the diagnostic section diagnoses a connection state of the electric mechanism and the drive circuit, in a state in which the switching circuit is turned off, on the basis of the voltage-division outputs of the additional voltage dividing circuit.

This configuration according to the invention makes possible diagnosis of the presence or absence of disconnection, ground fault or short circuiting not only when an electric mechanism is driven by connecting a switching circuit and first and second voltage dividing circuits as known diagnostic devices for electric mechanism drive circuits according to the prior art do, but also when the electric mechanism is not driven by supplying a bias voltage to the connection point between a pair of normally closed contacts and the switching circuit, connecting an additional resistance voltage dividing circuit between the connection point and a reference potential point, and causing the diagnostic section to diagnose the voltage-division outputs of the additional resistance voltage dividing circuit in a state in which the switching circuit is turned off.

The diagnostic device for electric mechanism drive circuits according to the invention may have, in addition to the above-described configuration, a capacitance element constituting an integrating circuit connected between a voltage division point and the reference potential point in the additional voltage dividing circuit.

This makes possible satisfactory diagnosis even if noise arises at the voltage division point because the noise would flow to the reference potential point through the capacitance element, and the noise entering into the diagnostic section can be substantially reduced thereby.

The diagnostic device for electric mechanism drive circuits according to the invention may have, in addition to the above-described configuration, a constant voltage setting element connected between the voltage division point and the reference potential point in the additional voltage dividing circuit.

This configuration makes possible satisfactory diagnosis because the constant voltage characteristics of the constant voltage setting element serve to remove noise.

DETAILED DESCRIPTION OF THE PREFERRED EMBODIMENT

Preferred embodiments of the present invention will be described in detail below with reference to accompanying drawings.

Figure 1:
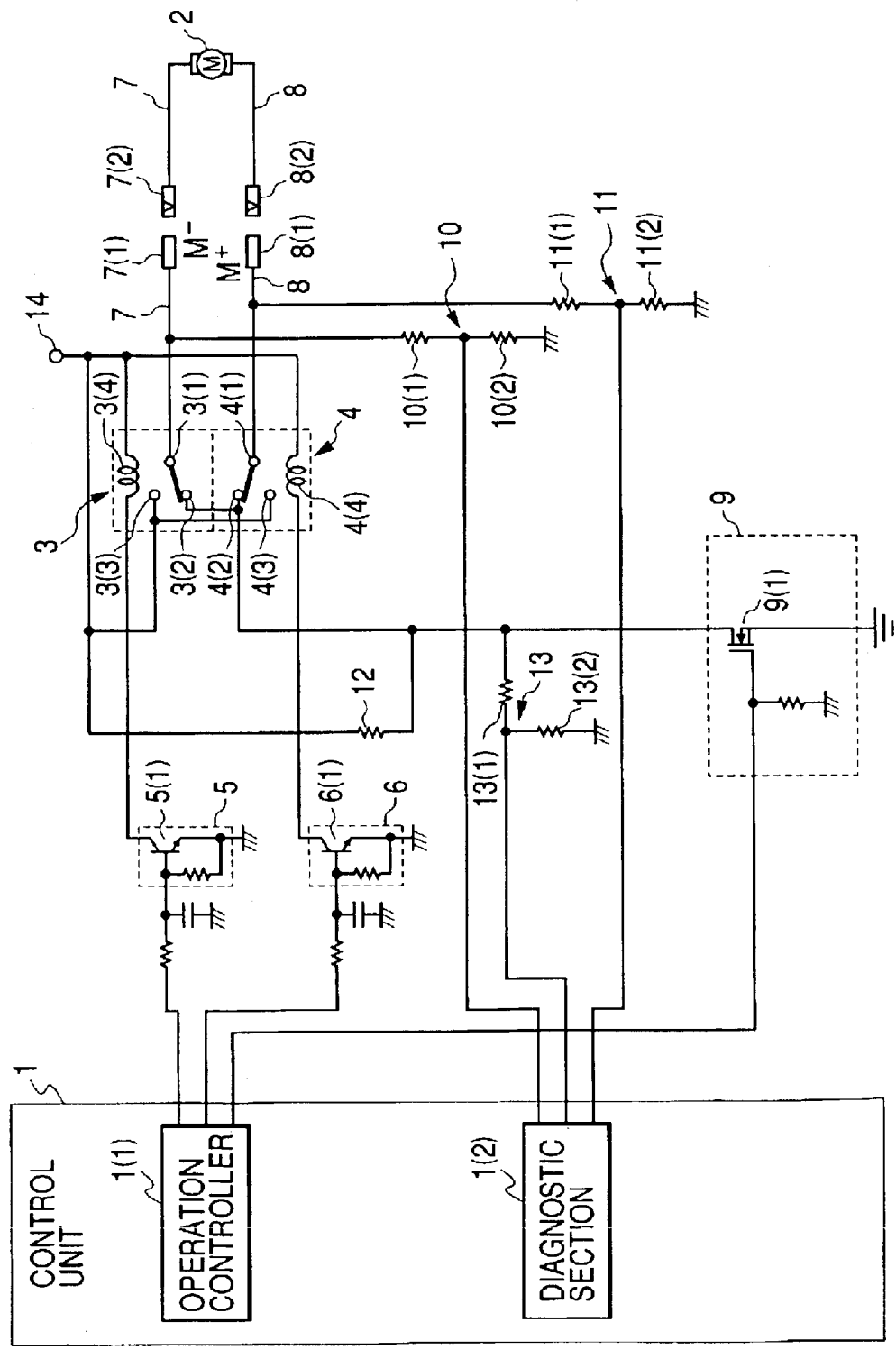
FIG. 1 is a circuit diagram illustrating the configuration of essential parts of a diagnostic device for electric mechanism drive circuits in a first mode of implementing the present invention.

FIG. 1 is a circuit diagram illustrating the configuration of essential parts of a diagnostic device for electric mechanism drive circuits, which is a first preferred embodiment of the invention.

As shown in FIG. 1, the diagnostic device for electric mechanism drive circuits in the first mode of implementing the invention is provided with a control unit 1 made up of a microcomputer having an operation controller 1(1) for controlling the overall operation and a diagnostic section 1(2) and the like; a motor 2 (electric mechanism) constituting a load; a first relay 3 having a movable contact 3(1), a normally closed contact 3(2), a normally open contact 3(3) and a drive coil 3(4); a second relay 4 having a movable contact 4(1), a normally closed contact 4(2), a normally open contact 4(3) and a drive coil 4(4); a first transistor drive circuit 5 which has a first transistor 5(1) and drives the first relay 3; a second transistor drive circuit 6 which has a second transistor 6(1) and drives the second relay 4; a first connection wiring section 7 having connection terminals 7(1) and 7(2) for connecting one end of the motor 2 and the first relay 3; and a second connection wiring section 8 having connection terminals 8(1) and 8(2) for connecting the other end of the motor 2 and the second relay 4. It is further provided with a switching circuit 9 having a field effect transistor 9(1); a first resistance voltage dividing circuit 10 made up of two series resistors 10(1) and 10(2); a second resistance voltage dividing circuit 11 made up of two series resistors 11(1) and 11(2), a bias supply resistor 12, an additional resistance voltage dividing circuit 13 made up of two series resistors 13(1) and 13(2), and a power supply terminal 14.

One end of the motor 2 is connected to the first connection wiring section 7 and the other end, to the second connection wiring section 8. In the first relay 3, the movable contact 3(1) is connected to the first connection wiring section 7, the normally closed contact 3(2), to the drain of the field effect transistor 9(1), the normally open contact 3(3), to the power supply terminal 14, one end of the drive coil 3(4), to the power supply terminal 14, and the other end, to the collector of the first transistor 5(1). In the second relay 4, the movable contact 4(1) is connected to the second connection wiring section 8, the normally closed contact 4(2), to the drain of the field effect transistor 9(1), the normally open contact 4(3), to the power supply terminal 14, one end of the drive coil 4(4), to the power supply terminal 14, and the other end, to the collector of the second transistor 6(1). In the first transistor drive circuit 5, the base of the first transistor 5(1) is connected to the operation controller 1(1) via a series resistor (no reference numeral assigned) and to grounding points (reference potential points) via a base resistor (no reference numeral assigned) and a shunt capacitor (no reference numeral assigned) and the emitter is directly grounded. In the second transistor drive circuit 6, the base of the second transistor 6(1) is connected to the operation controller 1(1) via a series resistor (no reference numeral assigned) and grounded via a base resistor (no reference numeral assigned) and a shunt capacitor (no reference numeral assigned), and the emitter is directly grounded.

In the switching circuit 9, the gate of the field effect transistor 9(1) is connected to the operation controller 1(1) and grounded via a resistor (no reference numeral assigned), and the source is directly grounded. In the first resistance voltage dividing circuit 10, one end of the resistor 10(1) is connected to the first connection wiring section 7, and the other is connected to the diagnostic section 1(2) and to one end of the resistor 10(2). One end of the resistor 10(2) is connected to the diagnostic section 1(2), and the other is grounded. In the second resistance voltage dividing circuit 11, one end of the resistor 11(1) is connected to the second connection wiring section 8, and the other is connected to the diagnostic section 1(2) and to one end of the resistor 11(2). One end of the resistor 11(2) is connected to the diagnostic section 1(2), and the other is grounded. One end of the bias supply resistor 12 is connected to the drain of the field effect transistor 9(1) and the other, to the power supply terminal 14. In the additional resistance voltage dividing circuit 13, one end of the resistor 13(1) is connected to the drain of the field effect transistor 9(1), and the other, to the diagnostic section 1(2) and to one end of the resistor 13(2). One end of the resistor 13(2) is connected to the diagnostic section 1(2), and the other is grounded.

The diagnostic device for electric mechanism drive circuits having the above-described configuration in the first mode of implementing the invention, operates as described below.

When the motor 2 is to be revolved in the forward direction, first an ON signal is supplied from the operation controller 1(1) to the field effect transistor 9(1) of the switching circuit 9 to turn on the field effect transistor 9(1), next an ON signal is supplied from the operation controller 1(1) to the first transistor 5(1) of the first transistor drive circuit 5 to turn on the first transistor 5(1), and a drive current is fed to the drive coil 3(4) of the first relay 3. Then the movable contact 3(1) is switched over from the normally closed contact 3(2) side to the normally open contact 3(3) side, a current flows from the power supply terminal 14 to the grounding point via the switched movable contact 3(1), the first connection wiring section 7, the motor 2, the second connection wiring section 8 and the unswitched movable contact 4(1), and the flow of this current causes the motor 2 to be revolved in the forward direction.

On the other hand, when the motor 2 is to be revolved in the reverse direction, first an ON signal is supplied from the operation controller 1(1) to the field effect transistor 9(1) of the switching circuit 9 to turn on the field effect transistor 9(1), next an ON signal is supplied from the operation controller 1(1) to the second transistor 6(1) of the second transistor drive circuit 6 to turn on the second transistor 6(1), and a drive current is fed to the drive coil 4(4) of the second relay 4. Then the movable contact 4(1) is switched over from the normally closed contact 4(2) to the normally open contact 4(3) side, a current flows from the power supply terminal 14 to the grounding point via the movable contact 4(1), the second connection wiring section 8, the motor 2, the first connection wiring section 7 and the unswitched movable contact 3(1), and the flow of this current causes the motor 2 to be revolved in the reverse direction.

When the motor 2 is driven to revolve in this way, the first resistance voltage dividing circuit 10 divides the voltage generated in the first connection wiring section 7 between the two resistors 10(1) and 10(2), and supplies the divided voltages to the diagnostic section 1(2). Similarly, the second resistance voltage dividing circuit 11 divides the voltage generated in the second connection wiring section 8 between the two resistors 11(1) and 11(2), and supplies the divided voltages to the diagnostic section 1(2). The diagnostic section 1(2) monitors the divided voltages supplied from the first resistance voltage dividing circuit 10 and the divided voltages supplied from the second resistance voltage dividing circuit 11 and, if any of those divided voltages becomes abnormal, for instance if at a timing when the first connection wiring section 7 or the second connection wiring section 8 is to be supplied with a source voltage, which is the voltage from the power supply terminal 14 (when the motor 2 is to be driven for revolution), a divided voltage matching that source voltage is not supplied, i.e. if the divided voltage is found failing to reach a first comparative voltage matching the preset source voltage, it will be diagnosed that there is either disconnection or ground fault in the first connection wiring section 7 or the second connection wiring section 8, or if no ground voltage is supplied to the first connection wiring section 7 or the second connection wiring section 8 at the timing it should be supplied (when the motor 2 is at halt) and instead any divided voltage is supplied, i.e. if the divided voltage is compared with a second comparative voltage matching a preset ground voltage and found surpassing the second comparative voltage, it will be diagnosed that there as arisen short circuiting in the first connection wiring section 7 or the second connection wiring section 8, and the abnormal state is notified by giving a pertinent indication on a display unit (not shown), lighting an alarm lamp and/or sounding an alarm buzzer.

Further, if an OFF signal is supplied from the operation controller 1(1) to the field effect transistor 9(1) of the switching circuit 9 in a short period of time immediately after the drive to revolve the motor 2 has ended to turn off the field effect transistor 9(1), even if short circuiting has arisen in the first connection wiring section 7 or the second connection wiring section 8, the source voltage or a voltage close to it emerging in the first connection wiring section 7 or the second connection wiring section 8 in a short-circuited state will not flow to the grounding point via the field effect transistor 9(1), and accordingly no drive current will flow to the motor 2 or any other circuit element, so that the motor 2 can be prevented from burning or other circuit elements from being damaged otherwise.

Further in the first mode of implementation, when the motor 2 is not driven for revolution, i.e. when the field effect transistor 9(1) of the switching circuit 9 is not turned on, a bias voltage is supplied from the power supply terminal 14 to the normally closed contacts 3(2) and 4(2) of the first and second relays 3 and 4, respectively, via the bias supply resistor 12, and the additional resistance voltage dividing circuit 13 divides the supplied bias voltage between the two resistors 13(1) and 13(2), and supplies the divided voltages to the diagnostic section 1(2). The diagnostic section 1(2) compares the supplied divided voltages with a third comparative voltage and a fourth comparative voltage representing the upper and lower limits of a comparative voltage range matching a preset bias voltage and, if the divided voltages are within this comparative voltage range (i.e. lower than the third comparative voltage and higher than the fourth comparative voltage), will diagnose that there is no trouble in any of the first connection wiring section 7, the second connection wiring section 8 and the motor 2. If the divided voltages are found to be within the comparative voltage range and higher than the third comparative voltage, it will be diagnosed that one or more of the first connection wiring section 7, the second connection wiring section 8 and the motor 2 are in or close to a short-circuited state, or if the divided voltages are found to be outside the comparative voltage range and higher than the fourth comparative voltage, it will be diagnosed that one or more of the first connection wiring section 7, the second connection wiring section 8 and the motor 2 are in or close to a state of ground fault.

In this process, further by driving either the first relay 3 or the second relay 4 and connecting either one of the terminals of the motor 2 to the power supply terminal 14, the source voltage is supplied to the additional resistance voltage dividing circuit 13. The additional resistance voltage dividing circuit 13 divides the supplied source voltage between the resistors 13(1) and 13(2), and supplies the divided voltages to the diagnostic section 1(2). The diagnostic section 1(2) compares the supplied divided voltages with a fifth comparative voltage matching the preset source voltage and, if these divided voltages are found surpassing the fifth comparative voltage, will diagnose that there is no trouble in any of the first connection wiring section 7, the second connection wiring section 8 and the motor 2 or, if the divided voltages are found lower than the fifth comparative voltage matching the source voltage and matching the bias voltage, i.e. within the comparative voltage range, will diagnose that there is some disconnection on the route of the first connection wiring section 7, the second connection wiring section 8 and the motor 2.

The result of such diagnosis is notified by giving a pertinent indication on a display unit (not shown), lighting an alarm lamp and/or sounding an alarm buzzer.

If the diagnostic section 1(2) diagnoses that there is a state of or close to short circuiting, a state of or close to ground fault or any other abnormality such as disconnection, and this diagnosis is notified by giving a pertinent indication on a display unit, lighting an alarm lamp and/or sounding an alarm buzzer, the diagnostic section 1(2) will performs processing within the operation controller 1(1) to immediately stop the drive of the motor 2 if it is being driven or, if it is not, to prevent the motor 2 from being driven even if any action is done to drive the motor 2.

In this way, the diagnostic device for electric mechanism drive circuits in the first mode of implementing the invention makes possible diagnosis of the presence or absence of any disconnection, ground fault or short circuiting not only when the motor 2 is being driven but also when the motor 2 is not driven.

Figure 2:
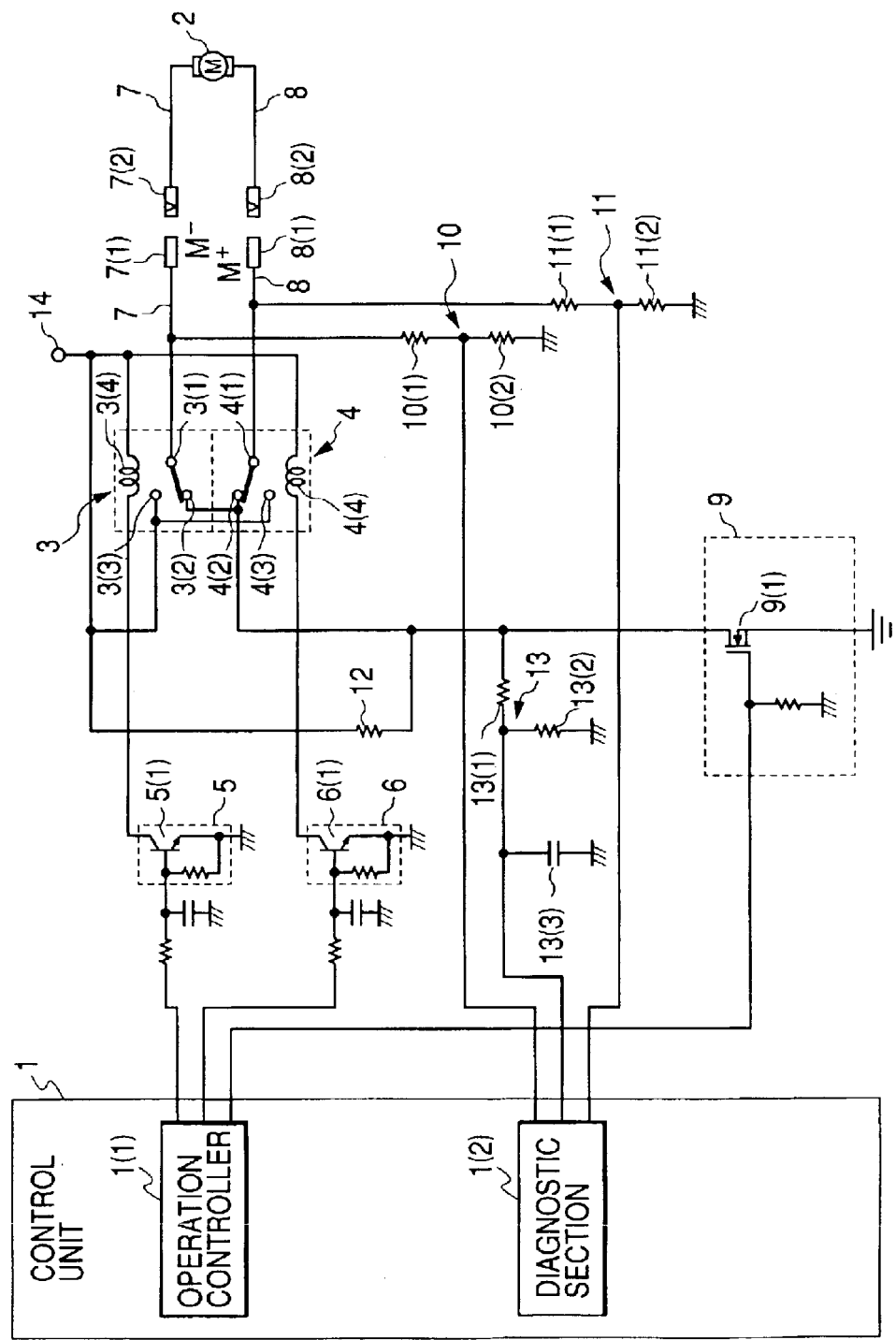
FIG. 2 is a circuit diagram illustrating the configuration of essential parts of a diagnostic device for electric mechanism drive circuits in a second mode of implementing the invention.

FIG. 2 is a circuit diagram illustrating the configuration of essential parts of a diagnostic device for electric mechanism drive circuits in a second mode of implementing the invention.

In FIG. 2, the same constituent elements as their counterparts in FIG. 1 are denoted by respectively the same reference signs.

The diagnostic device for electric mechanism drive circuits in the second mode of implementing the invention shown in FIG. 2 differs from that in the first mode of implementation in that a capacitance element 13(3) is connected in parallel to the resistor 13(2) of the additional resistance voltage dividing circuit 13, and is configured in the same way as the diagnostic device for electric mechanism drive circuits in the first mode of implementation in all the other respects.

As a result of the connection of this capacitance element 13(3), even if noise arises in the connection point between the resistor 13(1) and the resistor 13(2) of the additional resistance voltage dividing circuit 13 for some reason or other, the noise will flow to the grounding point via the capacitance element 13(3), which constitutes an integrating circuit together with the resistor 13(2), and therefore noise supplied from the connection point between the resistor 13(1) and the resistor 13(2) to the input terminal of the diagnostic section 1(2) can be substantially reduced, thereby making it possible to protect the input terminal of the diagnostic section 1(2).

Figure 3:
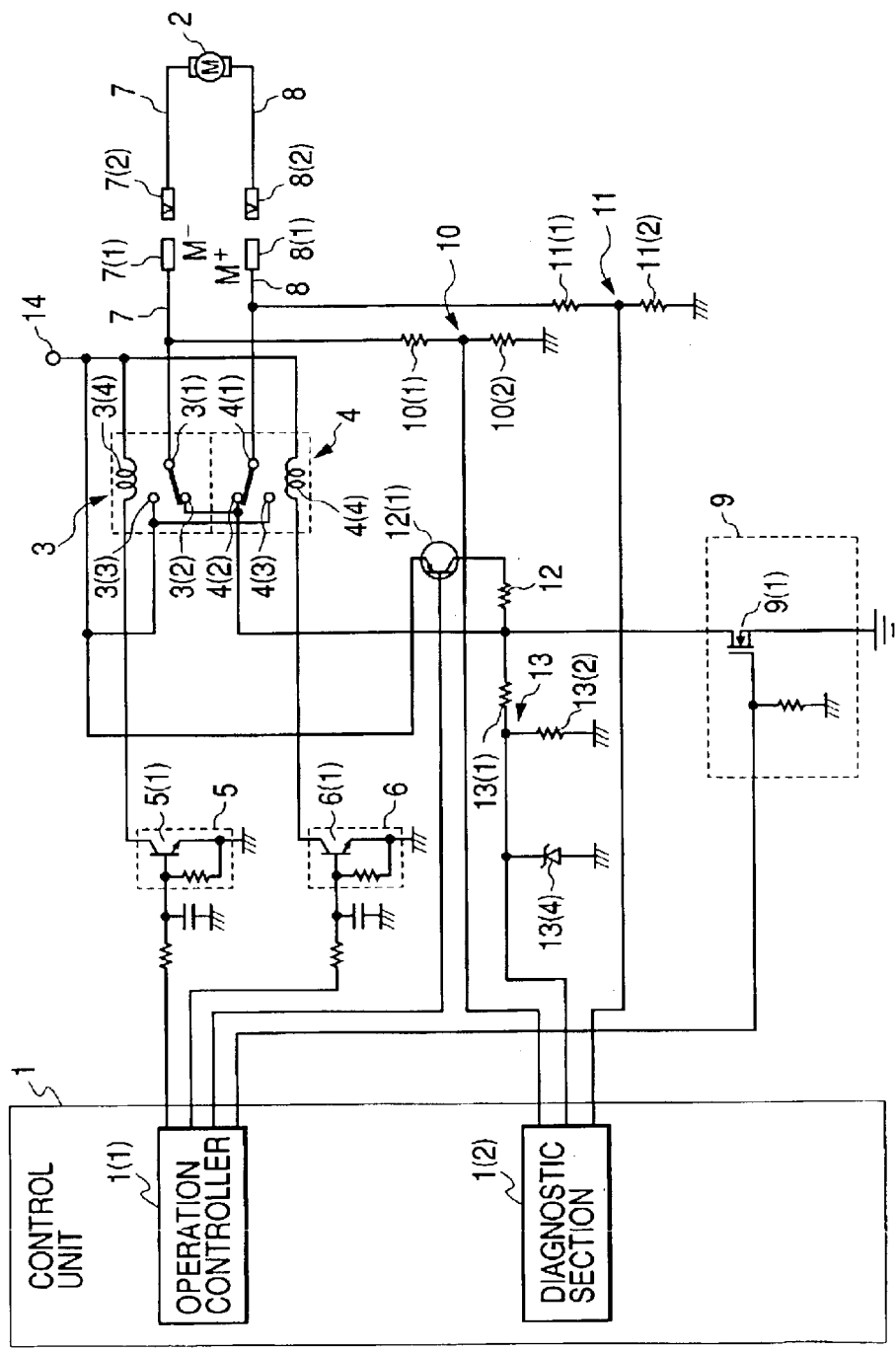
FIG. 3 is a circuit diagram illustrating the configuration of essential parts of a diagnostic device for electric mechanism drive circuits in a third mode of implementing the invention.
Figure 4:
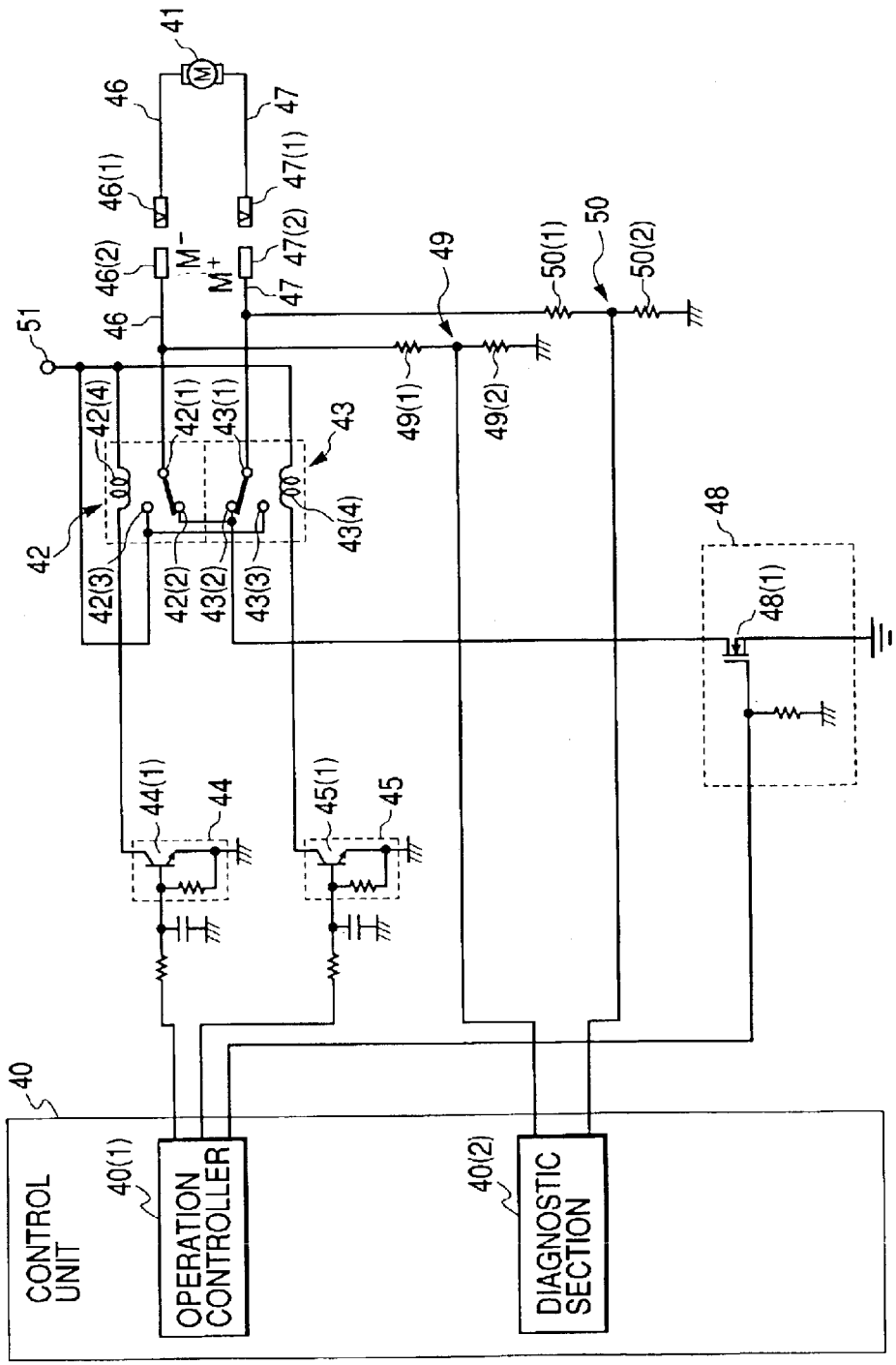
FIG. 4 is a circuit diagram showing one example of configuration of a known diagnostic device for motor drive circuits.

FIG. 3 is a circuit diagram illustrating the configuration of essential parts of a diagnostic device for electric mechanism drive circuits in a third mode of implementing the invention.

In FIG. 3, the same constituent elements as their counterparts in FIG. 2 are denoted by respectively the same reference signs.

The diagnostic device for electric mechanism drive circuits in the third mode of implementing the invention shown in FIG. 3 differs from that in the second mode of implementation in that a transistor 12(1) is connected to the bias supply resistor 12 in series and a Zener diode 13(4) is connected in parallel instead of connecting the capacitance element 13(3) in parallel to the resistor 13(2) of the additional resistance voltage dividing circuit 13, and is configured in the same way as the diagnostic device for electric mechanism drive circuits in the second mode of implementation in all the other respects.

In this diagnostic device for electric mechanism drive circuits in the third mode of implementation, when no diagnosis is needed, power consumption through the bias supply resistor 12 can be restrained by turning off the transistor 12(1). Further, where the capacitance element 13(3) is connected to configure an integrating circuit of the resistor 13(2) and the capacitance element 13(3) as in the diagnostic device for electric mechanism drive circuits in the second mode of implementation, the choice of the resistance of the resistor 13(2) and the capacitance of the capacitance element 13(3) is limited by the need to match the cut-off frequency of the integrating circuit with the noise arising at the connection point between the resistor 13(1) and the resistor 13(2) by appropriately selecting the resistance of the resistor 13(2) and the capacitance of the capacitance element 13(3), satisfactory diagnosis of the presence or absence of ground fault or short circuiting may become impossible when the motor 2 is not being driven.

Unlike that, if the Zener diode 13(4) is connected in place of the capacitance element 13(3) as in the diagnostic device for electric mechanism drive circuits in the third mode of implementation, not only can noise be removed by virtue of the Zener characteristics of the Zener diode 13(4) but also the limitation on the choice of the resistance of the resistor 13(2) can be removed because no integrating circuit is configured involving the resistor 13(2), with the result that satisfactory diagnosis of the presence or absence of ground fault or short circuiting is made possible even when the motor 2 is not being driven.

To add, although the electric mechanism in the first through third modes of implementation described above is the motor 2, the electric mechanism to which the invention is applicable is not limited to a motor, but can be applied to any other electric mechanism having similar functions to those of a motor.

As hitherto described, the present invention provides the advantage that diagnosis of the presence or absence of disconnection, ground fault or short circuiting is made possible not only when an electric mechanism is driven by connecting a switching circuit and first and second voltage dividing circuits as known diagnostic devices for electric mechanism drive circuits according to the prior art do, but also when the electric mechanism is not driven by supplying a bias voltage to the connection point between a normally closed contact and the switching circuit, connecting an additional resistance voltage dividing circuit between the connection point and a reference potential point, and supplying the voltage-division outputs of the additional resistance voltage dividing circuit to the diagnostic section.

What is claimed is:

1. A diagnostic device for electric mechanism drive circuits comprising:
  an electric mechanism,
  a drive circuit, provided with a pair of relays connected to the electric mechanism and a switching circuit connected between normally closed contacts of the pair of relays and a reference potential point, for driving the electric mechanism,
  an operation controller for regulating the drive circuit to control operation of the electric mechanism,
  voltage dividing circuits connected between the electric mechanism and the drive circuit, and
  a diagnostic section for diagnosing a state of supply of drive power to the electric mechanism on the basis of voltage-division outputs of the voltage dividing circuits, wherein
    a bias voltage supply circuit is provided to supply a bias voltage between connection points between the normally closed contacts of the pair of relays and the switching circuit,
    wherein an additional voltage dividing circuit is connected between the connection points and the reference potential point, and
    wherein the diagnostic section diagnoses a connection state of the electric mechanism and the drive circuit, in a state in which the switching circuit is turned off, on the basis of the voltage-division outputs of the additional voltage dividing circuit.

2. The diagnostic device for electric mechanism drive circuits according to claim 1, wherein the additional voltage dividing circuit has a capacitance element constituting an integrating circuit connected between a voltage division point and the reference potential point.

3. The diagnostic device for electric mechanism drive circuits according to claim 1, wherein the additional voltage dividing circuit has a constant voltage setting element connected between a voltage division point and the reference potential point.

* * * * *